US005271990A

United States Patent [19]

Kronzer et al.

[11] Patent Number: 5,271,990

[45] Date of Patent: Dec. 21, 1993

[54] IMAGE-RECEPTIVE HEAT TRANSFER PAPER

[75] Inventors: Frances J. Kronzer, Marietta, Ga.; Edward A. Parkkila, Jr., Whetmore, Mich.

[73] Assignee: Kimberly-Clark Corporation, Neenah, Wis.

[21] Appl. No.: 783,437

[22] Filed: Oct. 23, 1991

[51] Int. Cl.[5] .................... B32B 9/00

[52] U.S. Cl. .................... 428/195; 428/211; 428/327; 428/481; 428/913; 428/914

[58] Field of Search .................... 428/195, 154, 207, 407, 428/327, 211, 481, 913, 914

[56] References Cited

U.S. PATENT DOCUMENTS

| | | | |
|---|---|---|---|
| 3,634,135 | 1/1972 | Osaka et al. | 428/323 |
| 4,224,358 | 9/1980 | Hare | 427/147 |
| 4,235,657 | 11/1980 | Greenman | 156/234 |
| 4,284,456 | 8/1981 | Hare | 156/234 |
| 4,496,618 | 1/1985 | Pernicano | 428/201 |
| 4,513,107 | 4/1985 | Fabbrini | 524/56 |
| 4,517,237 | 5/1985 | Pernicano | 428/198 |
| 4,530,872 | 7/1985 | Pernicano | 428/200 |
| 4,542,078 | 9/1985 | Fitzer et al. | 428/914 |
| 4,555,436 | 11/1985 | Geurtsen | 428/200 |
| 4,732,815 | 3/1988 | Mizobuchi et al. | 428/484 |
| 4,773,953 | 9/1988 | Hare | 156/240 |
| 4,774,128 | 9/1988 | Koshizuka et al. | 428/212 |
| 4,778,729 | 10/1988 | Mizobuchi | 428/484 |
| 4,826,717 | 5/1989 | Kohashi et al. | 428/143 |
| 4,828,638 | 5/1989 | Brown | 156/234 |
| 4,837,200 | 6/1989 | Kondo et al. | 428/327 |
| 4,863,781 | 9/1989 | Kronzer | 428/200 |
| 4,908,345 | 3/1990 | Egashira et al. | 503/227 |
| 4,946,826 | 8/1990 | Kubo et al. | 503/227 |
| 4,965,132 | 10/1990 | Mizobuchi et al. | 428/411.1 |
| 4,966,815 | 10/1990 | Hare | 428/497 |
| 4,980,224 | 12/1990 | Hare | 428/202 |
| 5,071,823 | 12/1991 | Matsushita et al. | 503/227 |

*Primary Examiner*—Patrick J. Ryan
*Assistant Examiner*—W. Krynski
*Attorney, Agent, or Firm*—William E. Maycock

[57] ABSTRACT

An image-receptive heat transfer paper which includes: (a) a flexible cellulosic nonwoven web base sheet having top and bottom surfaces; and (b) an image-receptive melt-transfer film layer overlaying the top surface of the base sheet, which image-receptive melt-transfer film layer is composed of a thermoplastic polymer which melts in the range of from about 65 to about 180 degrees Celsius. Alternatively, the image-receptive melt-transfer film layer is replaced with a melt-transfer film layer overlaying the top surface of the nonwoven web and composed of a first thermoplastic polymer which melts in the range of from about 65 to about 180 degrees Celsius, and an image-receptive film layer overlaying the melt-transfer film layer and composed of a second thermoplastic polymer which melts in the range of from about 65 to about 180 degrees Celsius. The exposed surface of the image-receiving film layer has a smoothness value, independent of the smoothness of the base sheet, of at least about 10 cc/minute as measured by a Sheffield Smoothness Tester.

14 Claims, 1 Drawing Sheet

IMAGE-RECEPTIVE HEAT TRANSFER PAPER

CROSS-REFERENCE TO RELATED APPLICATION

An image-receptive heat transfer paper having at least one film layer comprised of a film-forming binder and a powdered thermoplastic polymer is described and claimed in copending and commonly assigned application Ser. No. 07/782,685, entitled IMAGE-RECEPTIVE HEAT TRANSFER PAPER, filed of even date in the names of Frank J. Kronzer and Edward A. Parkkila.

BACKGROUND OF THE INVENTION

The present invention relates to a heat transfer paper. More particularly, the present invention relates to a heat transfer paper having an enhanced receptivity for images made by wax-based crayons, thermal ribbon printers, impact ribbon or dot-matrix printers, and the like.

In recent years, a significant industry has developed which involves the application of customer-selected designs, messages, illustrations, and the like (referred to collectively hereinafter as "customer-selected graphics") on articles of clothing, such as T-shirts, sweat shirts, and the like. These customer-selected graphics typically are commercially available products tailored for that specific end-use. The graphics typically are printed on a release or transfer paper. They are applied to the article of clothing by means of heat and pressure, after which the release or transfer paper is removed.

Some effort has been directed to allowing customers the opportunity to prepare their own graphics for application to an article of clothing. A significant amount of this effort has been by Donald Hare and is represented by the five U.S. patents described below.

(1) U.S. Pat. No. 4,224,358 relates to a T-shirt coloring kit. More particularly, the patent is directed to a kit and method for applying colored emblems to T-shirts and the like. The kit includes a heat transfer sheet having an outlined pattern thereon and a plurality of colored crayons formed of a heat transferrable material, such as colored wax. The method of transferring a colored emblem to a T-shirt or the like includes the steps of applying the colored wax to the heat transfer sheet, positioning the heat transfer sheet on a T-shirt or the like, and applying a heated instrument to the reverse side of the heat transfer sheet, thereby transferring the colored wax to the T-shirt or the like. The nature of the heat transfer sheet is not specified.

(2) U.S. Pat. No. 4,284,456, a continuation-in-part of the first patent, relates to a method for transferring creative artwork onto fabric. In this case, the transferable pattern is created from a manifold of a heat transfer sheet and a reverse or lift-type copy sheet having a pressure transferable coating of heat transferable material thereon. By generating the pattern or artwork on the obverse face of the transfer sheet with the pressure of a drafting instrument, a heat transferable mirror image pattern is created on the rear surface of the transfer sheet by pressure transfer from the copy sheet. The heat transferable mirror image then can be applied to a T-shirt or other article by heat transfer. Again, the nature of the heat transfer sheet is not specified.

(3) U.S. Pat. No. 4,773,953 describes a method for creating personalized, creative designs or images on a fabric such as a T-shirt or the like through the use of a personal computer system. The method comprises the steps of:

(a) electronically generating an image;

(b) electronically transferring the image to a printer;

(c) printing the image with the aid of the printer on an obverse surface of a transfer sheet, said transfer sheet including a substrate with a first coating thereon transferable therefrom to the fabric by the application of heat or pressure, and a second coating on said first coating, said second coating defining said obverse face and consisting essentially of Singapore Dammar Resin;

(d) positioning the obverse face of the transfer sheet against the fabric; and (e) applying energy to the rear of the transfer sheet to transfer the image to the fabric.

The transfer sheet can be any commercially available transfer sheet consisting of a substrate having a heat transferable coating, wherein the heat transferable coating has been coated with an overcoating of Singapore Dammar Resin.

(4) U.S. Pat. No. 4,966,815, a division of the immediately preceding patent, describes a transfer sheet for applying a creative design to a fabric. The transfer sheet consists of a substrate, a first coating on the substrate of material which is transferable from the substrate to a receptor surface by the application of heat or pressure, and a second coating on the first coating, the second coating consisting essentially of Singapore Dammar Resin.

(5) U.S. Pat. No. 4,980,224 is a continuation-in-part of U.S. Pat. No. 4,773,953, described above, and an abandoned application. The patent describes a method and transfer sheet for transferring creative and personalized designs onto a T-shirt or similar fabric. The design can be created manually, electronically, or a combination of both using personal computers, video cameras, or electronic photocopiers. The transfer sheet in essence is the transfer sheet of U.S. Pat. No. 4,966,815 with the addition of abrasive particles to the Singapore Dammar Resin coating. The abrasive particles serve to enhance the receptivity of the transfer sheet to various inks and wax-based crayons. The patent specifically mentions the use of white silica sand and sugar as the abrasive particles.

In addition to the foregoing references, several references are known which relate generally to the transfer of an image-bearing laminate to a substrate.

U.S. Pat. No. 4,555,436 to Guertsen et al. relates to a heat transferable laminate. The patent describes an improved release formulation for use in a heat transferable laminate wherein an ink design image is transferred from a carrier to an article by the application of heat to the carrier support. On transfer the release splits from the carrier and forms a protective coating over the transferred design. The improved release is coated onto the carrier as a solvent-based wax release. The release coating then is dried to evaporate the solvent contained therein. The improved release is stated to have the property that its constituents remain in solution down to temperatures approaching ambient temperature. Upon transfer, the release forms a protective coating which may be subjected to hot water. The improved release contains a montan wax, a rosin ester or hydrocarbon resin, a solvent, and ethylene-vinyl acetate copolymer having a low vinyl acetate content.

U.S. Pat. No. 4,235,657 to Greenman et al. relates to a melt transfer web. The web is useful for transferring preprinted inked graphic patterns onto natural or synthetic base fabric sheets, as well as other porous, semi-porous, or non-porous material workpieces. The transfer web is comprised of a flexible, heat-stable substrate, preferably a saturated paper having a top surface coated with a first film layer of a given polymer serving as a heat-separable layer, and a second film layer superposed on the first film layer and comprised of another given polymer selected to cooperate with the first film layer to form a laminate having specific adhesion to porous, semi-porous, or non-porous materials when heat softened. The desired pattern or design is printed on the coated surface, i.e., the second film layer.

U.S. Pat. No. 4,863,781 to Kronzer also describes a melt transfer web. In this case, the web has a conformable layer which enables the melt transfer web to be used to transfer print uneven surfaces. In one embodiment, the melt transfer web has a separate conformable layer and separate release layer. The conformable layer consists of copolymers of ethylene and vinyl acetate or copolymers of ethylene and acrylic acid, which copolymers have a melt index greater than 30. The release layer consists of polyethylene films or ethylene copolymer films. In another embodiment, a single layer of copolymers of ethylene and acrylic acid having a melt index between 100 and 4000 serves as a conformable release layer.

Finally, it may be noted that there are a large number of references which relate to thermal transfer papers. Most of them relate to materials containing or otherwise involving a dye and/or a dye transfer layer, a technology which is quite different from that of the present invention.

Notwithstanding the progress which has been made in recent years in the development of heat transfer papers, there still is a need for an improved heat transfer paper for use in industries based on the application of customer-designed graphics to fabrics. The prior art heat transfer papers either are not particularly well suited for use in transferring customer-designed graphics or they produce stiff, gritty, and/or rubbery images on fabric.

SUMMARY OF THE INVENTION

It therefore is an object of the present invention to provide an improved heat transfer paper having an enhanced receptivity for images made by wax-based crayons, thermal ribbon printers, impact ribbon or dot-matrix printers, and the like.

This and other objects will be apparent to one having ordinary skill in the art from a consideration of the specification and claims which follow.

Accordingly, the present invention provides an image-receptive heat transfer paper which comprises:

(a) a flexible cellulosic nonwoven web base sheet having top and bottom surfaces; and (b) an image-receptive melt-transfer film layer overlaying the top surface of said base sheet, which image-receptive melt-transfer film layer is comprised of a thermoplastic polymer which melts in the range of from about 65 to about 180 degrees Celsius, in which the exposed surface of said image-receptive melt-transfer film layer has a smoothness value, independent of the smoothness of the base sheet, of at least about 10 cc/minute as measured by a Sheffield Smoothness Tester.

The present invention also provides an image-receptive heat transfer paper which comprises:

(a) a flexible cellulosic nonwoven web base sheet having top and bottom surfaces;

(b) a melt-transfer film layer overlaying the top surface of said base sheet, which melt transfer film layer is comprised of a first thermoplastic polymer which melts in the range of from about 65 to about 180 degrees Celsius; and (c) an image-receptive film layer overlaying said melt-transfer film layer, which image-receptive film layer is comprised of a second thermoplastic polymer which melts in the range of from about 65 to about 180 degrees Celsius, in which the exposed surface of said image-receptive film layer has a smoothness value, independent of the smoothness of the base sheet, of at least about 10 cc/minute as measured by a Sheffield Smoothness Tester.

In preferred embodiments, the flexible cellulosic nonwoven web base sheet is a latex-impregnated paper. In other preferred embodiments, each thermoplastic polymer is selected from the group consisting of polyolefins, polyesters, and ethylene-vinyl acetate copolymers. In still other preferred embodiments, each thermoplastic polymer melts in the range of from about 80 to about 120 degrees Celsius.

DETAILED DESCRIPTION OF THE INVENTION

Figure 1:
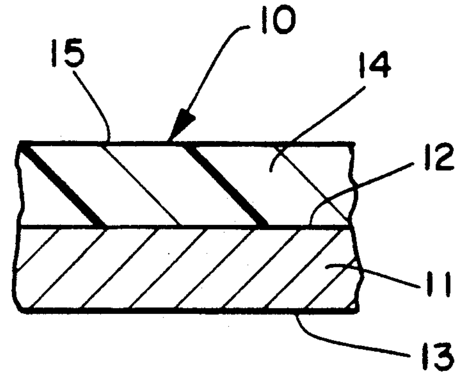
FIG. 1 is a fragmentary sectional view of a first embodiment of an image-receptive heat transfer paper made in accordance with the present invention.

Referring to the drawings for the purpose of illustrating the present invention, there is shown in FIG. 1 a fragmentary section of image-receptive heat transfer paper 10. Paper 10 comprises cellulosic nonwoven web base sheet 11 and image-receptive melt-transfer film layer 14 having exposed surface 15. Base sheet 11 has top surface 12 and bottom surface 13. Film layer 14 overlays top surface 12 of base sheet 11. An image to be transferred (not shown) is applied to surface 15 of film layer 14. Surface 15 has a smoothness value, independent of the smoothness of the base sheet, of at least about 10 cc/minute as measured by a Sheffield Smoothness Tester.

Figure 2:
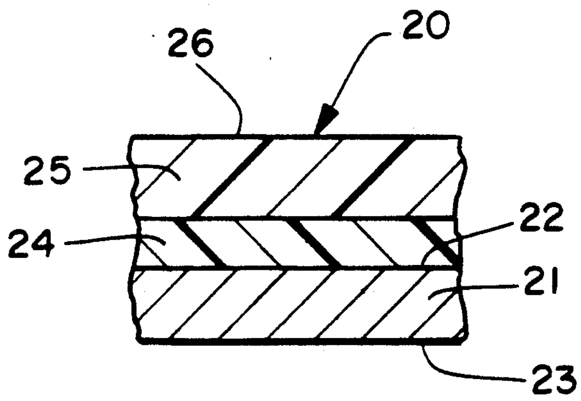
FIG. 2 is a fragmentary sectional view of a second embodiment of an image-receptive heat transfer paper made in accordance with the present invention.

As shown in FIG. 1, the image-receptive heat-transfer film layer is a single film layer. If desired, however, such film layer can be separated into a melt-transfer film layer and an image-receptive film layer; this embodiment is shown in FIG. 2. In FIG. 2, a fragmentary section of image-receptive heat transfer paper 20 is shown. Paper 20 comprises cellulosic nonwoven web base sheet 21, melt-transfer film layer 24, and image-receptive film layer 25 having exposed surface 26. Base sheet 21 has top surface 22 and bottom surface 23. Film layer 24 overlays top surface 22 of base sheet 21 and film layer 25 in turn overlays film layer 24. An image to be transferred (not shown) is applied to surface 26 of film layer 25. Surface 26 has a smoothness value, independent of the smoothness of the base sheet, of at least about 10 cc/minute as measured by a Sheffield Smoothness Tester.

The image-receptive heat transfer paper of the present invention is based on a flexible cellulosic nonwoven web base sheet having top and bottom surfaces. Such base sheet is not known to be critical, provided it has sufficient strength for handling, coating, sheeting, and other operations associated with its manufacture, and for removal after transferring an image. The base sheet typically is a paper such as is commonly used in the manufacture of heat transfer papers.

In preferred embodiments, the base sheet will be a latex-impregnated paper. By way of illustration, a preferred paper is a water leaf sheet of wood pulp fibers or alpha pulp fibers impregnated with a reactive acrylic polymer latex such as Rhoplex®°B-15 (Rohm and Haas Company, Philadephia, Pa). However, any of a number of latexes can be used, if desired, some examples of which are summarized in Table I, below.

TABLE I

Suitable Latexes

| Polymer Type | Product Identification |
|---|---|
| Polyacrylates | Hycar ® 26083, 26084, 26120, 26106 and 26322<br>B. F. Goodrich Company<br>Cleveland, Ohio<br>Rhoplex ® B-15, HA-8, HA-12, NW-1715<br>Rohm and Haas Company<br>Philadelphia, Pennsylvania<br>Carboset ® XL-52<br>B. F. Goodrich Company<br>Cleveland, Ohio |
| Styrene-butadienecopolymers | Butofan ® 4262<br>BASF Corporation<br>Sarnia, Ontario, Canada<br>DL-219, DL-283<br>Dow Chemical Company<br>Midland, Michigan |
| Ethylene-vinylacetate copolymers | Dur-O-Set ® E-666, E-646, E-669<br>National Starch & Chemical Co.<br>Bridgewater, New Jersey |
| Nitrile rubbers | Hycar ® 1572, 1577, 1570 × 55<br>B. F. Goodrich Company<br>Cleveland, Ohio |
| Poly(vinyl chloride) | Geon ® 552<br>B. F. Goodrich Company<br>Cleveland, Ohio |
| Poly(vinyl acetate) | Vinac XX-210<br>Air Products and Chemicals, Inc.<br>Napierville, Illinois |
| Ethylene-acrylatecopolymers | Michem ® Prime 4990<br>Michelman, Inc.<br>Cincinnati, Ohio<br>Adcote 56220<br>Morton Thiokol, Inc.<br>Chicago, Illinois |

An especially preferred base sheet has a basis weight of 13.3 lbs/1300 $ft^2$ (50g/$m^2$) before saturation. The impregnated paper preferably contains 18 parts polymer per 100 parts fiber by weight, and has a basis weight of 15.6 lbs/1300 $ft^2$ (59 g/$m^2$). A suitable caliper is 3.8 mils ± 0.5 mil (96±13 micrometers).

The image-receptive melt-transfer film layer overlaying the top surface of the flexible cellulosic nonwoven web is comprised of a thermoplastic polymer which melts in the range of from about 65 to about 180 degrees Celsius (°C). In preferred embodiments, the thickness of the image-receptive melt-transfer film layer is from about 12 to about 80 micrometers. In other preferred embodiments, the thermoplastic polymer melts in the range of from about 80° C. to about 120° C.

The nature of the thermoplastic polymer is not known to be critical. That is, any known thermoplastic polymer can employed so long as it meets the criteria specified herein. Preferably, the thermoplastic polymer is selected from the group consisting of polyolefins, polyesters, and ethylene-vinyl acetate copolymers.

If desired, as already noted, the image-receptive melt-transfer film layer can be separated into a melt-transfer film layer and an image-receptive film layer. In this instance, the melt-transfer film layer overlays the top surface of the nonwoven web base sheet and the image-receptive film layer overlays the melt transfer film layer.

In general, the melt-transfer film layer is comprised of a first thermoplastic polymer and the image-receptive film layer is comprised of a second thermoplastic polymer, each of which melts in the range of from about 65° C. to about 180° C. In preferred embodiments, the total thickness of the image-receptive film layer and the melt-transfer film layer is from about 12 to about 80 micrometers. In other preferred embodiments, each of the first and second thermoplastic polymers melts in the range of from about 80° C. to about 120° C.

The nature of the first and second thermoplastic polymers is not known to be critical. That is, any known thermoplastic polymer can employed so long as it meets the criteria specified herein. Preferably, the first thermoplastic polymer is selected from the group consisting of polyolefins, polyesters, ethylene-vinyl acetate copolymers, ethylene-methacrylic acid copolymers, and ethylene-acrylic acid copolymers. In addition, the second themoplastic polymer preferably is selected from the group consisting of polyolefins, polyesters, and ethylene-vinyl acetate copolymers.

The term "melts" and variations thereof are used herein only in a qualitative sense and are not meant to refer to any particular test procedure. Reference herein to a melting temperature or range is meant only to indicate an approximate temperature or range at which a thermoplastic polymer melts and flows under film-forming conditions to result in a substantially smooth film.

Manufacturers' published data regarding the melt behavior of thermoplastic polymers correlate with the melting requirements described herein. It should be noted, however, that either a true melting point or a softening point may be given, depending on the nature of the material. For example, materials such a polyolefins and waxes, being composed mainly of linear polymeric molecules, generally melt over a relatively narrow temperature range since they are somewhat crystalline below the melting point.

Melting points, if not provided by the manufacturer, are readily determined by known methods such as differential scanning calorimetry. Many polymers, and especially copolymers, are amorphous because of branching in the polymer chains or the side-chain constituents. These materials begin to soften and flow more gradually as the temperature is increased. It is believed that the ring and ball softening point of such materials, as determined by ASTM E-28, is useful in predicting their behavior in the present invention. Moreover, the melting points or softening points described are better indicators of performance in this invention than the chemical nature of the polymer.

The image-receiving surface of the heat transfer paper of the present invention, e.g., exposed surfaces 15 and 26 of FIGS. 1 and 2, respectively, must have a smoothness value, independent of the smoothness of the base sheet, of at least about 10 cc/minute as measured by a Sheffield Smoothness Tester. Preferably, such smoothness value will be in the range of from about 10 to about 400 cc/minute.

The Sheffield Smoothness Tester, available from Testing Machines, Inc., Amityville, N.Y., measures the smoothness of a flat surface. Because of the manner in which measurements are made, the smoothness of a surface is inversely proportional to the smoothness value obtained. That is, higher smoothness values indicate less smooth, or rougher, surfaces. Consequently, the image-receiving surface of the heat transfer paper of the present invention cannot have a perfectly smooth surface; i.e., a least some degree of roughness is required. Thus, the approximate minimum degree of roughness (or approximate maximum degree of smoothness) is represented by the lower smoothness value.

The measurement of the smoothness of the image-receiving surface must be done on an image-receiving film layer or image-receiving melt-extrusion film layer which is independent of the smoothness of the base sheet, for example, on a film layer which has been removed from the base sheet. Obviously, any relatively thin film layer placed over a rough base sheet surface will reflect the roughness of the base sheet and, consequently, a higher Sheffield smoothness value will be obtained. Such a surface, however, typically does not have good crayon receptivity. It is necessary, therefore, to remove the film layer from the base sheet before making the smoothness measurement. Alternatively, the film layer can be cast on a completely smooth surface for measuring purposes. Thus, the measurement of the smoothness value of the film layer is made independent of the smoothness of the base sheet, i.e., when the film layer is not overlaying the base sheet.

The method by which any film layer is formed on the base sheet is not known to be critical. For example, a preformed melt-extruded film can be laid over the top surface of the base sheet and the resulting combination passed through a heated nip roll to cause the film layer to adhere to the base sheet. Additional film layers can be added in like manner, either separately or at the same time, as desired. Alternatively, one or more film layers can be melt-extruded onto the top surface of the base sheet, in which case the use of a nip roll is desirable in order to effect adequate bonding between layers. Although such nip roll can be heated or cooled, a cooled nip roll generally is preferred.

In general, any known means of imparting roughness to a surface of a film can be employed. As a practical matter, the use of an embossing roll is preferred. Such embossing roll can be heated or cooled as circumstances require. The embossing roll usually is part of a nip through which the heat transfer paper is passed, with the embossing roll contacting the film layer portion of the paper and imparting the desired degree of roughness to the exposed surface of the topmost film layer.

The present invention is further defined by the example which follows. Such example, however, is not to be construed as limiting in any way either the spirit or scope of the present invention.

EXAMPLE

The base sheet employed was a water leaf sheet of wood pulp fibers impregnated with an acrylic polymer latex, Rhoplex® B-15 (Rohm and Haas Company, Philadelphia, Pa). The polymer content of the dispersion was 46 percent by weight. The impregnating dispersion also contained clay and titanium dioxide at levels of 16 parts and 4 parts, respectively, per 100 parts of polymer on a dry weight basis. The pH of the impregnating dispersion was adjusted by adding 0.21 part of ammonia per 100 parts of polymer (ammonia was added as a 28 percent aqueous ammonia solution). The sheet had a basis weight of 13.3 lbs/1300 $ft^2$ (50 $g/m^2$) before impregnation. The impregnated base sheet contained 18 parts impregnating solids per 100 parts fiber by weight, and had a basis weight of 15.6 lbs/1300 $ft^2$ (59 $g/m^2$), both on a dry weight basis. The caliper of the impregnated base sheet was 3.8 mils $\pm$ 0.3 mil ($97\pm8$ micrometers).

The bottom surface of the base sheet was coated with approximately 3 lbs/1300 $ft^2$ (11 $g/m^2$) of Reichold 97-907 (Reichold Chemicals, Inc., Dover, Del.), a release coating based on a poly(vinyl acetate) latex in water.

The top surface of the base sheet was coated by coextruding a 25-micrometer film of Elvax 3200 and a 19-micrometer film of Surlyn 1702. The Elvax 3200 film was overlaying the base sheet, while the Surlyn 1702 film was overlaying the Elvax 3200 film. The coextrusion was accomplished with a pilot extrusion coater operating with a temperature of 177° C. at the rear of the screws, gradually increasing to 243° C. at the front of the screws. The adapters and die were set at 243° C. The extruders had "standard" type screws. The die used was a flex lip film type with a "coathanger" type distributor.

The films and paper were bonded together in a nip which had a rubber roll on the paper side and a patterned chill or embossing roll on the film side. The chill roll pattern consisted of a screen pattern having 90 lines per inch (35.4 lines per centimeter, with each line having a depth of 100 micrometers. Both Elvax 3200 and Surlyn 1702 were supplied by E. I. DuPont de Nemours & Company, Inc., Polymer Products Department, Ethylene Polymers Division, Wilmington, Del. Elvax 3200 is an ethylene-vinyl acetate copolymer containing approximately 25 percent vinyl acetate and modified with wax. It has a melt index of 32 g/10 minutes. Surlyn 1702 is an ionomer consisting of a crosslinked ethylene-methacrylic acid copolymer having a melt index of 14 g/10 minutes.

In order to evaluate the effect of the pattern on the image-receiving surface, the procedure was repeated twice. In the first repeat trial, the patterned chill roll was replaced with a smooth, polished (glossy) chill roll. In the second repeat trial, a chill roll having a matte surface was used. The film portion of a heat transfer paper made with each of the three different chill rolls was removed and the smoothness of the film portion measured with the Sheffield Smoothness Tester. In addition, the receptivity to crayon of the exposed film surface of each heat release paper was evaluated. The results are summarized in Table 1.

TABLE 1

Film Portion Smoothness Values and Crayon Receptivity of Exposed Film Surface

| Chill Roll | Smoothness Value | Crayon Receptivity: Crayola® | Crayon Receptivity: Sargent |
|---|---|---|---|
| Patterned | 290 | Excellent | Excellent |
| Glossy | 0 | Poor | Poor |

TABLE 1-continued

Film Portion Smoothness Values and Crayon Receptivity of Exposed Film Surface

| Chill Roll | Smoothness Value | Crayon Receptivity | |
|---|---|---|---|
| | | Crayola ® | Sargent |
| Matte | 10 | Poor | Fair |

Having thus described the invention, numerous changes and modifications thereof will be readily apparent to those having ordinary skill in the art without departing from the spirit or scope of the invention.

What is claimed is:

1. An image-receptive heat transfer paper which comprises:

(a) a flexible cellulosic nonwoven web base sheet having top and bottom surfaces; and (b) an image-receptive melt-transfer film layer overlaying the top surface of said base sheet, which image-receptive melt-transfer film layer is comprised of a thermoplastic polymer selected from the group consisting of polyolefins, polyesters, and ethylene-vinyl acetate copolymers and which melts in the range of from about 65 to about 180 degrees Celsius, in which the exposed surface of said image-receptive melt-transfer film layer has a smoothness value, independent of the smoothness of the base sheet, of at least about 10 cc/minute as measured by a Sheffield Smoothness Tester.

2. The image-receptive heat transfer paper of claim 1, in which the thickness of said image receptive melt-transfer film layer is from about 12 to about 80 micrometers.

3. The image-receptive heat transfer paper of claim 1, in which said thermoplastic polymer is selected from the group consisting of polyolefins, polyesters, and ethylene-vinyl acetate copolymers.

4. The image-receptive heat transfer paper of claim 1, in which said thermoplastic polymer is an ethylene-vinyl acetate copolymer.

5. The image-receptive heat transfer paper of claim 1, in which said thermoplastic polymer melts in the range of from about 80 to about 120 degrees Celsius.

6. The image-receptive heat transfer paper of claim 1, in which said smoothness value is in the range of from about 10 to about 400 cc/minute.

7. An image-receptive heat transfer paper which comprises:

(a) a flexible cellulosic nonwoven web base sheet having top and bottom surfaces;

(b) a melt-extruded, melt-transfer film layer overlaying the top surface of said base sheet, which melt transfer film layer is comprised of a first thermoplastic polymer selected from the group consisting of polyolefins, polyesters, ethylene-vinyl acetate copolymers, ethylene-methacrylic acid copolymers, and ethylene-acrylic acid copolymers and which melts in the range of from about 65 to about 180 degrees Celsius; and (c) a melt-extruded, image-receptive film layer overlaying said melt-transfer film layer, which image-receptive film layer is comprised of a second thermoplastic polymer selected from the group consisting of polyolefins, polyesters, and ethylene-vinyl acetate copolymers and which melts in the range of from about 65 to about 180 degrees Celsius, in which the exposed surface of said image-receptive film layer has a smoothness value, independent of the smoothness of the base sheet, of at least about 10 cc/minute as measured by a Sheffield Smoothness Tester.

8. The image-receptive heat transfer paper of claim 7, in which said base sheet is a latex-impregnated paper.

9. The image-receptive heat transfer paper of claim 7, in which the total thickness of said melt-transfer film layer and said image-receptive film layer is from about 12 to about 80 micrometers.

10. The image-receptive heat transfer paper of claim 7, in which said first thermoplastic polymer is selected from the group consisting of ethylene-methacrylic acid copolymers and ethylene-acrylic acid copolymers.

11. The image-receptive heat transfer paper of claim 7, in which said first thermoplastic polymer is selected from the group consisting of ethylene-methacrylic acid copolymers and ethylene-acrylic acid copolymers and said second thermoplastic polymer is an ethylene-vinyl acetate copolymer.

12. The image-receptive heat transfer paper of claim 7, in which said first thermoplastic polymer melts in the range of from about 80 to about 120 degrees Celsius.

13. The image-receptive heat transfer paper of claim 7, in which said second thermoplastic polymer melts in the range of from about 80 to about 120 degrees Celsius.

14. The image-receptive heat transfer paper of claim 7, in which said smoothness value is in the range of from about 10 to about 400 cc/minute.

* * * * *

UNITED STATES PATENT AND TRADEMARK OFFICE

CERTIFICATE OF CORRECTION

PATENT NO. : 5,271,990

DATED : December 21, 1993

INVENTOR(S) : Frances J. Kronzer et al

It is certified that error appears in the above-indentified patent and that said Letters Patent is hereby corrected as shown below:

Column 5, line 31, "Styrene-butadienecopolymers" should read --Styrene-butadiene copolymers--;

Column 5, line 48, "Ethylene-acrylatecopolymers" should read --Ethylene-acrylate copolymers--;

Column 9, line 19, "(b) an image-receptive..." should read --(b) a melt-extruded, image-receptive--.

Signed and Sealed this

Fifteenth Day of November, 1994

Attest:

BRUCE LEHMAN

Attesting Officer

Commissioner of Patents and Trademarks